Patented Jan. 15, 1929.

1,699,449

UNITED STATES PATENT OFFICE.

ARTHUR B. RAY, OF FLUSHING, NEW YORK, ASSIGNOR TO CARBIDE AND CARBON CHEMICALS CORPORATION, A CORPORATION OF NEW YORK.

PROCESS AND COMPOSITION FOR PURIFYING LIQUIDS.

No Drawing. Application filed May 3, 1922. Serial No. 558,287.

This invention relates to the removal of mineral and organic material carried in solution or suspension by a liquid. Although of general application where such conditions obtain, the invention has particular reference to processes and compositions for eliminating mineral substances and coloring matter from sugar solutions. It is this use of the invention which will be described by way of illustration herein.

According to prior processes for refining sugar solutions, either animal charcoal or specially prepared, so called vegetable decolorizing carbons have been used as the purifying agent. Animal charcoal is effective in the removal of mineral matter, but its active carbon content is too low for efficient absorption and elimination of coloring substances. On the other hand, the decolorizing carbons heretofore employed are relatively good decolorizing materials, but do not satisfactorily eliminate the mineral matter in solution. To obtain the requisite decolorizing action by the use of boneblack, it is necessary to use an excessive amount of that material, owing to the fact that 80% or more of its weight is calcium phosphate, while if a decolorizing carbon is the refining agent, much of the mineral matter remains in solution and prevents approximately an equal weight of the sugar from crystallizing. Preparations other than animal charcoal which have been used for this purpose are referred to herein under the generic name of decolorizing carbon.

I have devised an improved refining and decolorizing process in which practically all objectionable constituents are removed from the treated solution by a purifying agent comprising mineral and coloring matter eliminants in proportion regulated to effect the desired result with a minimum of excess agent. My invention comprises broadly the use of a suitable mineral removing agent, in general an alkaline earth metal phosphate, with an effective decolorizing carbon. The mineral removing agent and the carbon may be used in adjusted proportions either in succession or simultaneously in admixture; or special purifying compositions, prepared according to this invention by distributing a phosphate on carbon, may be used.

I prepare a phosphate of calcium and use the same as a mineral eliminant, in conjunction with a decolorizing carbon of high efficiency, preferably activated carbon. The phosphate alone has approximately twice the efficiency of boneblack with respect to removal of mineral matter. Vegetable carbon with a decolorizing efficiency in excess of fifty times that possessed by boneblack is obtainable. It will be seen, therefore, that by the regulated use of these materials in combination, as described herein, a more complete decolorization and purification can be obtained than is possible according to prior methods.

In one application of the invention, an impure and dark colored cane sugar solution is treated with tricalcium phosphate in amount sufficient to substantially eliminate the mineral matter in the solution. Such matter exists mainly in the form of compounds of sodium, potassium, calcium, and other metals with various organic bodies and mineral acids. The calcium phosphate appears to absorb these mineral substances by a physical or mechanical action, or to react chemically with them to form insoluble complex compounds. The best results are obtained by the use of phosphates which have a low apparent density. Tricalcium phosphate precipitated by addition of an excess of a soluble calcium salt to an aqueous solution of a phosphate is in suitable physical condition. It must, of course, be thoroughly washed in order to completely remove all soluble substances.

The amount of phosphate required to eliminate a given quantity of salts will vary according to particular conditions, and no exact statement of equivalence can be given. Simple tests and analysis will serve to show what amount of phosphate should be added.

The solution freed from mineral matter as above described may be filtered and is then treated with an efficient decolorizing carbon. Activated carbon is preferably used. The solution may of course be decolorized by the carbon before the mineral matter is eliminated, or the phosphate and carbon may be added together. The solution may be heated and stirred during treatment, according to usual refining practice.

In some cases I prefer to prepare a special purifying agent comprising decolorizing carbon having a phosphate precipitated throughout its mass. A suitable carbon, in granular or powdered condition, may be saturated with a solution of a phosphate or phosphoric acid. The mineral content of the carbon, comprising compounds of calcium and other metals, reacts with the solution to precipitate insoluble phosphates in the pores and interstices of the carbon particles. If the carbon is low in mineral matter, it may be saturated with a salt of a metal yielding an insoluble phosphate, for example calcium chlorid, before applying the phosphate solution. The product should be washed to eliminate soluble reaction products. The phosphates distributed in the manner described are much more efficient agents for removing mineral matter than is animal charcoal, and the deposition of the phosphate does not materially impair the decolorizing power of the carbon.

The spent phosphate may be regenerated for further use by leaching with dilute acid or in any other suitable way. When the color-discharging carbon has become substantially saturated with coloring matter, it may be revivified by heat treatment, in accordance with known practice. In case a composite phosphate-carbon agent is used, both leaching and heat treatment may be applied.

I have obtained best results from tricalcium phosphate, but the other insoluble phosphates of calcium, as well as the insoluble phosphates of barium, strontium and magnesium, may be used. Activated carbon will preferably be used, on account of its high decolorizing efficiency. However, the basic idea of the invention is the use of phosphate and carbon in amounts adjusted to secure the desired elimination of organic and inorganic impurities without excess of the purifying agents, and the specific character of the phosphate and carbon may be varied as desired so long as this general result is attained.

I claim:

1. Process of purifying solutions containing dissolved salts and organic coloring matter which comprises treating the solution with a quantity of water-insoluble alkaline earth metal phosphate adjusted for the precipitation of the principal portion of said salts, and with a quantity of absorptive carbon adjusted for the removal of substantially all of said coloring matter.

2. A composition for purifying liquids, containing dissolved and suspended impurities, comprising activated carbon associated with a water-insoluble alkaline earth metal phosphate.

3. A composition for purifying liquids containing dissolved and suspended impurities, comprising activated carbon associated with tricalcium phosphate.

4. A composition for purifying liquids containing dissolved and suspended impurities, comprising activated carbon having a precipitate of tricalcium phosphate distributed throughout its mass.

5. A composition for purifying liquids containing mineral and organic coloring impurities, comprising absorptive carbon associated with a water-insoluble alkaline earth metal phosphate, each in proportion substantially equivalent in purifying power to the respective impurities to be removed thereby.

6. Process of purifying sugar solutions containing dissolved salts and organic coloring matter which comprises treating the solution with a composition containing precipitated calcium phosphate and absorptive carbon, the proportions of phosphate and carbon being adjusted in accordance with the respective quantities of dissolved salts and coloring matter present.

In testimony whereof, I affix my signature.

ARTHUR B. RAY.